(12) United States Patent
Matsuda (10) Patent No.: US 8,416,668 B2
(45) Date of Patent: Apr. 9, 2013

(54) INFORMATION RECORDING APPARATUS, INFORMATION REPRODUCING APPARATUS AND RECORDING MEDIA

(75) Inventor: Takahiro Matsuda, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 12/453,982

(22) Filed: May 28, 2009

(65) Prior Publication Data
US 2010/0080103 A1   Apr. 1, 2010

(30) Foreign Application Priority Data
Sep. 29, 2008   (JP) .................................. 2008-249508

(51) Int. Cl.
G11B 7/00   (2006.01)
(52) U.S. Cl.
USPC ......................................................... 369/103
(58) Field of Classification Search .................. 369/103, 369/47.1, 275.3
See application file for complete search history.

(56) References Cited

U.S. PATENT DOCUMENTS

| 7,486,424 | B2 * | 2/2009 | Kanaoka et al. | ................ 359/22 |
| 7,508,744 | B2 * | 3/2009 | Yamakage et al. | ............. 369/103 |
| 7,639,586 | B2 * | 12/2009 | Uno et al. | ..................... 369/103 |
| 2004/0179251 | A1 | 9/2004 | Anderson et al. | |
| 2005/0063028 | A1 | 3/2005 | Yasuda et al. | |
| 2006/0109535 | A1 | 5/2006 | Kuroda et al. | |
| 2007/0206255 | A1 | 9/2007 | Yamakage et al. | |
| 2007/0268810 | A1 * | 11/2007 | Kim et al. | ..................... 369/283 |
| 2008/0192311 | A1 | 8/2008 | Horimai | |
| 2009/0046336 | A1 | 2/2009 | Sugita et al. | |

FOREIGN PATENT DOCUMENTS

| JP | 2003-337524 | | 5/2002 |
| JP | 2004-272268 | | 3/2004 |
| JP | 2005-099176 | A | 4/2005 |
| JP | 2006-208921 | A | 8/2006 |
| JP | 2007-046354 | A | 2/2007 |
| JP | 2007-240581 | | 9/2007 |
| WO | WO 2004/102542 | A1 | 5/2004 |
| WO | WO 2007/046354 | A1 | 4/2007 |

OTHER PUBLICATIONS

Office Action, from the Japanese Patent Office, in corresponding Japanese Patent Application No. 2008-249508, dated Apr. 24, 2012, p. 1.
Office Action from the Japanese Patent Office in the corresponding Japanese Patent Application No. 2008-249508, dated Jan. 31, 2012 with a partial English translation.

* cited by examiner

Primary Examiner — Nabil Hindi
(74) Attorney, Agent, or Firm — Stites & Harbison PLLC; Juan Carlos A. Marquez, Esq.; Steven J. Weyer, Esq.

(57) ABSTRACT

An apparatus for recording information in an optical-information recording media by holography includes a signal-light irradiation unit, a reference-light irradiation unit, a reference light angle adjustment unit, and a positioning unit for positioning irradiation positions of the signal light and the reference light. The optical-information recording media is divided into N (N≧2) recording regions, M multiplexed information can be recorded in the respective recording regions by the reference light angle adjustment unit which changes the angle of the reference light at M angles ($\theta_1$, $\theta_2$, ..., and $\theta_M$) corresponding to a multiplexing number (M≧2), management information for the M multiplexed information is multiplexed and recorded in the same recording region as a-th information (1≦a≦M) with a reference light angle θa, and the management information on all the N recording regions are recorded at a common reference light angle.

17 Claims, 7 Drawing Sheets

FIG. 7B $\theta_{1a} \ne \theta_{2a}$

FIG. 7A $\theta_{1a} \ne \theta_{2a}$

INFORMATION RECORDING APPARATUS, INFORMATION REPRODUCING APPARATUS AND RECORDING MEDIA

INCORPORATION BY REFERENCE

The present application claims priority from Japanese application JP-A-2008-249508 filed on Sep. 29, 2008, the content of which is hereby incorporated by reference into this application.

BACKGROUND OF THE INVENTION

The present invention relates to an apparatus which records information in a recording media or reproduce the information from the recording media by holography and also to the recording media based on holography.

Studies concerning next generation storage techniques have been made, and attention has been focused on holographic recording techniques for digitally recording information by holography.

The hologram recording technique refers to a technique for recording information by an interference pattern which is generated when signal light having information on page data two-dimensionally modulated by a spatial light modulator is superimposed on reference light within a recording media and which causes refractive index modulation in the recording media.

In an information reproduction mode, when the recording media is exposed with the reference light used in a record mode with the same location, a hologram recorded in the recording media acts as a grating and produces diffracted light. The diffracted light is reproduced as the same light as signal light including phase information.

One of hologram recording techniques is disclosed, for example, in JP-A-2004/272268. This patent document recites a so-called angle multiplex recording system in which simultaneously when a signal light flux is focused on an optical-information recording media through a lens, reference light of collimated light flux is irradiated on the recording media to cause interference for hologram recording, and by changing an incident angle of the reference light to the optical recording media, different page data are displayed on a spatial light modulator for multiplexed recording. Also disclose in the cited document is a technique in which the signal light is focused through a lens to locate an opening (spatial filter) at the waist of the focused light, whereby intervals between adjacent holograms can be made short, thus increasing a recording density and a capacity when compared with those in the prior art angle multiplex recording system.

Another one of hologram recording technique is disclosed, for example, in WO2004/102542. This patent document represents an example of a shift multiplex system in which light from inner pixels is used as signal light and light from outer annular strip pixels is used as reference light in a single spatial light modulator, the both light fluxes are focused on an optical recording media through an identical lens, and the signal light and the reference light are interfered in the vicinity of the focal surface of the lens for hologram recording.

SUMMARY OF THE INVENTION

When information is recorded in an optical-information recording media by holography, management information is also recorded. The "management information" as used herein refers to, for example, the number of multiplexed recorded information (which will be referred to as multiplexing number, hereinafter), a reference light angle for reading out the multiplexed recorded information, results of various sorts of adjustments, or the like. In this specification, "unit region" refers to a region where information multiplexed at the position of a single pickup 11 is recorded.

However, in some cases, for example, where management information about the entire disc is concentrated on one location in a recording media. In this case, however, if access to the individual unit regions and access to the region where the management information is concentratedly recorded are alternately repeated, then there may be a possibility of increasing time necessary for access processing.

It can be assumed another case, for example, where corresponding management information is recorded in each associated unit region. However, when the angles of the reference light for the management information to be recorded are random for the respective unit regions as an example, an access to the management information of the continuous regions requires to make the angle of the reference light changed, thus possibly increasing the time necessary for the access processing.

In this way, the access efficiency may be reduced depending upon the arrangement of the management-information recording regions. However, the aforementioned JP-A-2004-272268 and WO2004-102542 fail to explain the above problems.

It is therefore an object of the present invention to increase information recording/reproduction efficiencies for a recording media in which information is to be multiplexed and recorded by holography.

The above object is attained by inventions recited in Claims. A typical one of the inventions is as follows. More specifically, there is provided an optical-information recording/reproducing apparatus which records information in an optical-information recording media by holography and which includes a signal-light irradiation unit for irradiating the optical-information recording media with signal light, a reference-light irradiation unit for irradiating the optical-information recording media with reference light, a reference-light-angle adjustment unit for adjusting the angle of the reference light at which the reference light is irradiated onto the optical-information recording media, and a positioning unit for positioning exposed positions of the signal light and the reference light on the optical-information recording media. The optical-information recording media is divided into N ($N \geq 2$) recording regions, M pieces of multiplexed information are recorded in the respective recording regions by changing the angle of the reference light to M angles ($\theta_1, \theta_2, \ldots,$ and $\theta_M$) corresponding to a multiplexing number M ($M \geq 2$) with use of the reference-light-angle adjustment unit, management information on the M pieces of multiplexed information are multiplexed and recorded at the reference light angle θa as an a-th ($1 \leq a \leq M$) information of the M pieces of information in the recording regions, and the management information of the respective regions are recorded in all the N regions at the common reference light angle.

In accordance with the present invention, expediting recording/reproducing information in/from a recording media where the information is to be multiplexed and recorded by holography becomes possible.

Other objects, features and advantages of the invention will become apparent from the following description of the embodiments of the invention taken in conjunction with the accompanying drawings.

DETAILED DESCRIPTION OF THE EMBODIMENTS

An embodiment of the present invention will be explained.

Embodiment 1

Explanation will be made as to an optical-information recording/reproducing apparatus as an embodiment of an optical-information recording apparatus.

Figure 1:
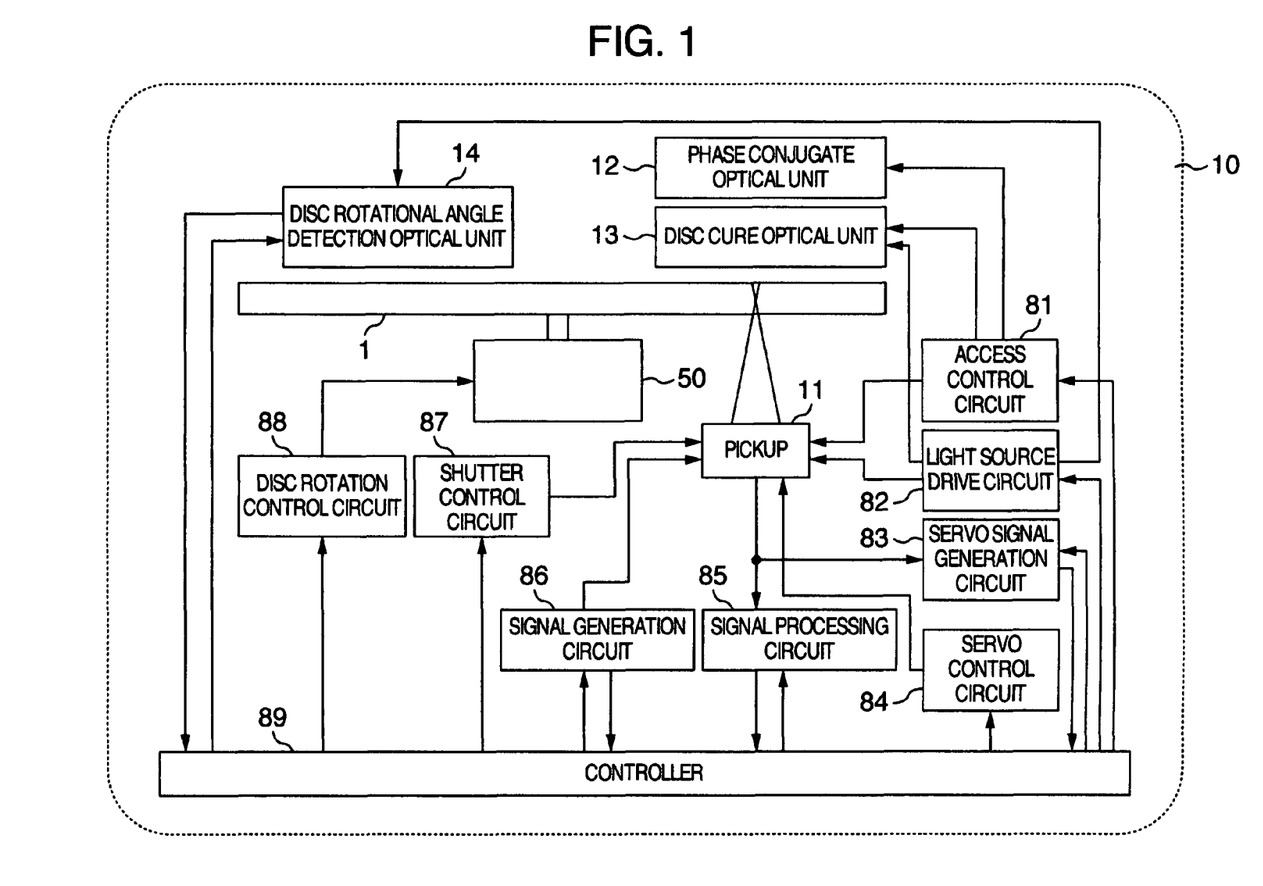
FIG. 1 schematically represents an optical-information recording/reproducing apparatus in accordance with an embodiment of the present invention.

FIG. 1 represents a general arrangement of an optical-information recording/reproducing apparatus for recording and/or reproducing digital information by holography.

The optical-information recording/reproducing apparatus 10 includes a pickup 11, a phase-conjugate optical unit 12, a disc-cure optical unit 13, a disc-rotational-angle detection optical unit 14, and a rotating motor 50. An optical-information recording media 1 is arranged to be rotated by the rotating motor 50. The optical-information recording media 1 is formed, for example, as an optical disc in which information can be recorded by holography.

The pickup 11 emits reference light and signal light to the optical-information recording media 1 to play a role of recording digital information by holography.

At this time, an information signal to be recorded is sent from a controller 89 via a signal generation circuit 86 to a spatial light modulator (to be explained later) provided in the pickup 11, whereas the signal light is modulated by the spatial light modulator.

When it is desired to reproduce information already recorded in the optical-information recording media 1, phase conjugate light for reference light emitted from the pickup 11 is generated by the phase-conjugate optical unit 12. The "phase conjugate light" as used herein refers to a light wave which advances in the reverse direction while keeping the same wave front as input light. Reproduction light to be reproduced by the phase conjugate light is detected by a detector (to be explained later) provided in the pickup 11, and reproduced by a signal processing circuit 85.

Exposure times for the reference light and the signal light to be irradiated onto the optical-information recording media 1 can be adjusted by controlling an open/close time for a shutter (to be explained later) provided in the pickup 11 under control of the controller 89 via a shutter control circuit 87.

The disc-cure optical unit 13 plays a role of generating an optical beam for pre-cure and post-cure the optical-information recording media 1. The term "pre-cure" as used herein means, when information is recorded at a desired position in the optical-information recording media 1, a pre-step of irradiating a predetermined optical beam to the desired position prior to application of the reference light and the signal light. The term "post-cure" means a post-step of irradiating a predetermined optical beam to the desired position to prevent additional recording of information after the information is recorded at the desired position in the optical-information recording media 1.

The disc-rotational-angle detection optical unit 14 is used to detect a rotational angle of the optical-information recording media 1. When the optical-information recording media 1 is adjusted at a desired rotational angle, the disc-rotational-angle detection optical unit 14 can detect a signal indicative of the rotational angle, and the controller 89 can control the rotational angle of the optical-information recording media 1 through a disc-rotation control circuit 88 on the basis of the detected signal.

A predetermined light-source drive current is supplied from a light-source drive circuit 82 to respective light sources provided in the pickup 11, the disc-cure optical unit 13 and the disc-rotational-angle detection optical unit 14, so that optical beams can be emitted from the respective light sources with predetermined quantities of light.

The pickup 11, the phase-conjugate optical unit 12, and the disc-cure optical unit 13 have each a mechanism of slidably shifting along the radial direction of the optical-information recording media 1, and the position control is carried out through an access control circuit 81.

Since the technique for recording information by holography can record ultra-high density information, an allowable error, e.g., for a tilt or a positional displacement in the optical-information recording media 1 tends to be very small. Thus a mechanism of detecting an amount of shift or displacement arisen from causes having a small allowable errors such as a tilt or positional displacement of the optical-information recording media 1 may be provided in the pickup 11, so that a servo-signal generation circuit 83 generates a servo control signal and a servo mechanism for correcting the displacement amount through a servo control circuit 84 is provided in the optical-information recording/reproducing apparatus 10.

The pickup 11, the phase-conjugate optical unit 12, the disc-cure optical unit 13, and the disc-rotational-angle detection optical unit 14 may have several optical arrangements or all the optical arrangements may be combined into a single optical arrangement for simplicity.

Figure 2:
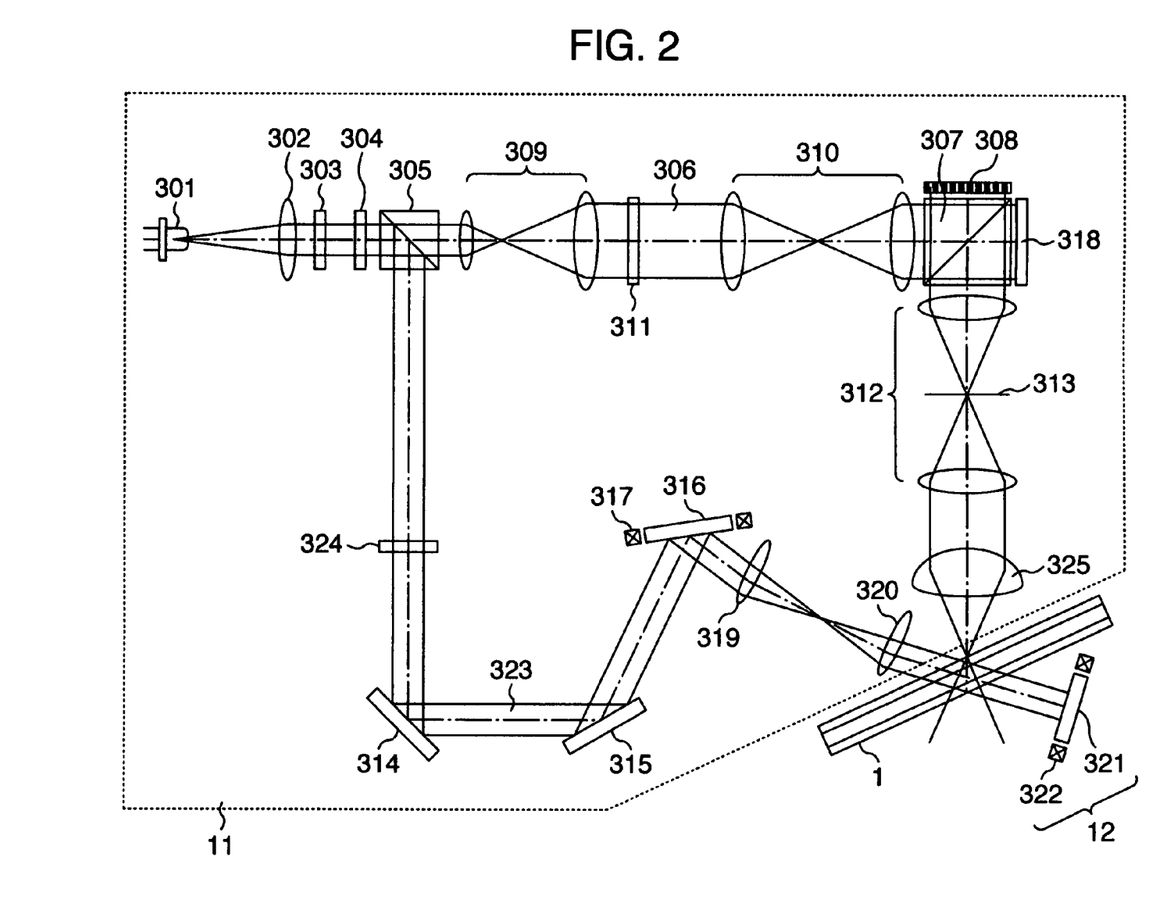
FIG. 2 schematically represents a pickup in the optical-information recording/reproducing apparatus of the embodiment as an example.

FIG. 2 represents an example of an optical arrangement of the pickup 11 in the optical-information recording/reproducing apparatus 10.

An optical beam emitted from a light source 301 is passed through a collimating lens 302 and then directed to a shutter 303. When the shutter 303 is opened, the optical beam is passed through the shutter 303 and then to an optical element 304 such as ½ wavelength plate, which in turn controls the polarization direction of the optical beam in such a manner that a light quantity ratio between P and S polarizations has a desired value. Thereafter, the optical beam having the controlled polarization direction is directed to a PBS (Polarization Beam Splitter) prism 305.

The optical beam passed through the PBS prism 305 is enlarged in the diameter of the beam by a beam expander 309, and then directed to a spatial light modulator 308 through a phase mask 311, a relay lens 310, and a PBS prism 307.

A signal beam 306 having information added by the spatial light modulator 308 is passed through the PBS prism 307 and propagated to a relay lens 312 and a spatial filter 313. Thereafter, the signal beam 306 is focused on the optical-information recording media 1 by an objective lens 325.

Meanwhile, an optical beam, which is reflected by the PBS prism 305 acts as a reference beam, directed to a polarization-direction conversion element 324 so that the polarization direction of the beam is set at a predetermined direction according as the record mode or reproduction mode, and then directed through a mirror 314 and a mirror 315 to a galvanometer mirror 316. Since the galvanometer mirror 316 can adjust its angle by an actuator 317, the optical beam is passed through a lens 319 and a lens 320 so that the incident angle of the reference beam to the optical-information recording media 1 can be set at a desired angle.

When the signal beam and the reference beam are irradiated onto the optical-information recording media 1 so as to be mutually superimposed in this way, an interference pattern is formed within the recording media and the pattern is written in the recording media to record the information. Since the galvanometer mirror 316 can change the incident angle of the reference beam to the optical-information recording media 1, recording based on the angle multiplexing can be achieved.

When it is desired to reproduce the recorded information, phase conjugate light is generated by directing the reference beam to the optical-information recording media 1 and by reflecting the optical beam passed through the optical-information recording media 1 by a galvanometer mirror 321 as mentioned above. A galvanometer mirror 321 can adjust its angle by an actuator 322.

A reproduced optical beam reproduced by the phase conjugate light is propagated through the objective lens 325, the relay lens 312, and the spatial filter 313. Thereafter, the reproduced optical beam is reflected by the PBS prism 307 and directed to a detector 318 to reproduce the recorded signal.

Figure 3:
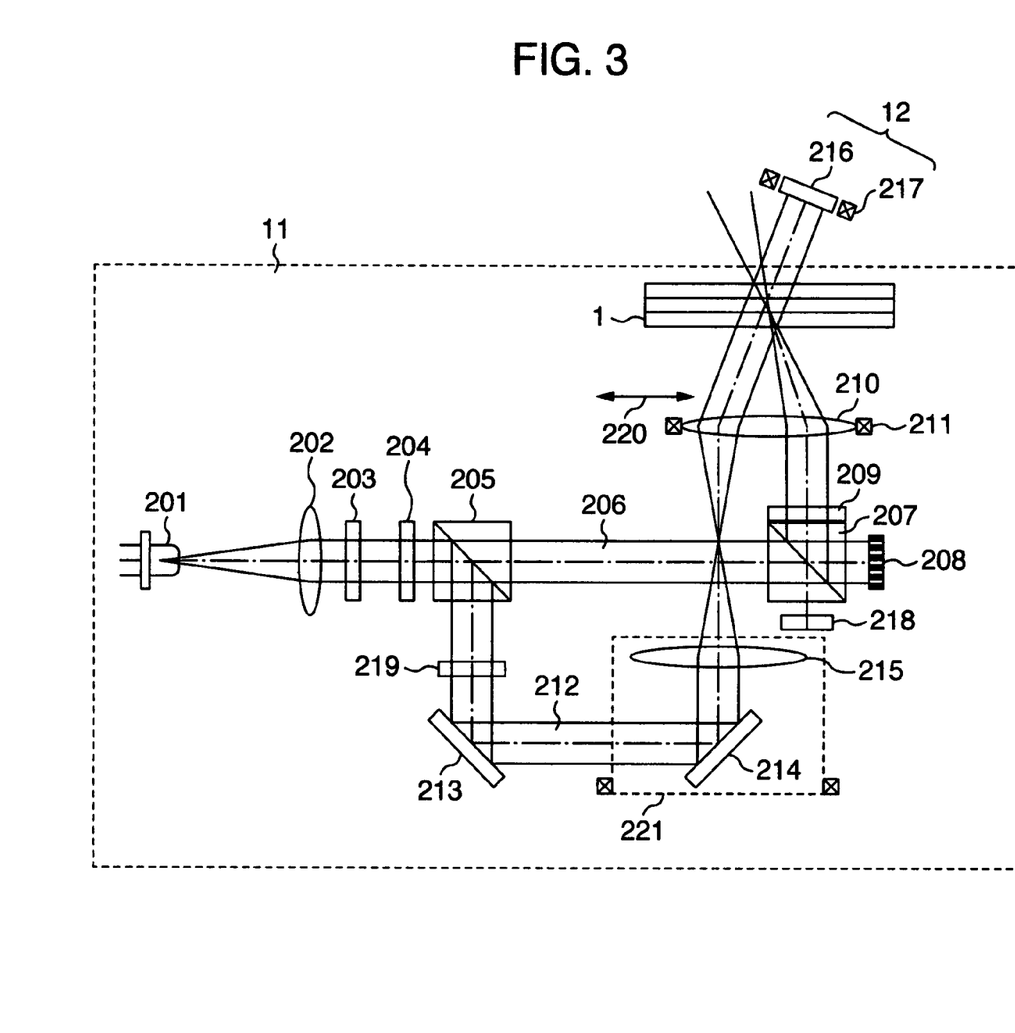
FIG. 3 schematically represents a pickup in the optical-information recording/reproducing apparatus of the embodiment as another example.

In this connection, the arrangement of the optical unit in the pickup 11 is not limited to a specific example represented in FIG. 2 but such an arrangement as represented in FIG. 3 may be employed.

Explanation will be made next as to another arrangement of the optical unit in the pickup 11 by referring to FIG. 3. The optical unit represented by FIG. 3 has an advantage over the arrangement of the optical unit represented by FIG. 2 that the unit can be remarkably reduced in size because the arrangement of FIG. 3 is made to direct the signal beam and the reference beam to an identical object lens.

An optical beam emitted from a light source 201 is passed through a collimating lens 202 and directed to a shutter 203. When the shutter 203 is opened, the optical beam is passed through the shutter 203, directed to an optical element 204 such as a ½ wavelength plate so as to control the polarization direction of the optical beam in such a manner that a light quantity ratio between P and S polarizations has a desired value, and then directed to a PBS prism 205.

The optical beam passed through the PBS prism 205 is directed to a spatial light modulator 208 via a PBS prism 207.

A signal beam 206 having information added by the spatial light modulator 208 is reflected by the PBS prism 207 and then propagated to an angle filter 209 to pass only an optical beam having a predetermined incident angle therethrough. Thereafter, the signal beam is focused by an objective lens 210 on the optical-information recording media 1.

Meanwhile, an optical beam reflected by the PBS prism 205, which acts as a reference beam 212, is directed to a polarization direction conversion element 219 to set the polarization direction of the beam at a predetermined polarization direction according as the record mode or reproduction mode, and then directed to a lens 215 via a mirror 213 and a mirror 214.

The lens 215 plays a role of condensing the reference beam 212 onto the back focus surface of the objective lens 210. A reference beam once condensed onto the back focus surface of the objective lens 210 is converted by the objective lens 210 again to collimated light, and then directed to the optical-information recording media 1.

In this case, the objective lens 210 or an optical block 221 can be driven by an actuator 211 in such a direction as indicated by a reference numeral 220. Since the relative positional relationship of a focused point between the objective lens 210 and the back focus surface of the objective lens 210 can be changed by shifting the position of the objective lens 210 or the position of the optical block 221 along the drive direction 220. Thus the incident angle of the reference beam incident on the optical-information recording media 1 can be set at a desired angle.

When the signal beam and the reference beam are directed onto the optical-information recording media 1 so as to be mutually superimposed in this way, an interference pattern is formed within the recording media. When the pattern is written into the recording media, the information can be recorded in the media. Since a shift of the position of the objective lens 210 or the optical block 221 along the drive direction 220 enables the incident angle of the reference beam to the optical-information recording media 1 to be varied, recording based on the angle multiplexing can be achieved.

When it is desired to reproduce the recorded information, phase conjugate light is generated by directing the reference beam to the optical-information recording media 1 and reflecting the optical beam passed through the optical-information recording media 1 by a galvanometer mirror 216 as mentioned above. A galvanometer mirror 216 can adjust its angle by an actuator 217.

A reproduced optical beam reproduced by the phase conjugate light is propagated through the objective lens 210 and the angle filter 209. Thereafter, the reproduced optical beam is passed through the PBS prism 207, and directed to a detector 218 to reproduce the recorded signal.

Figure 4A:
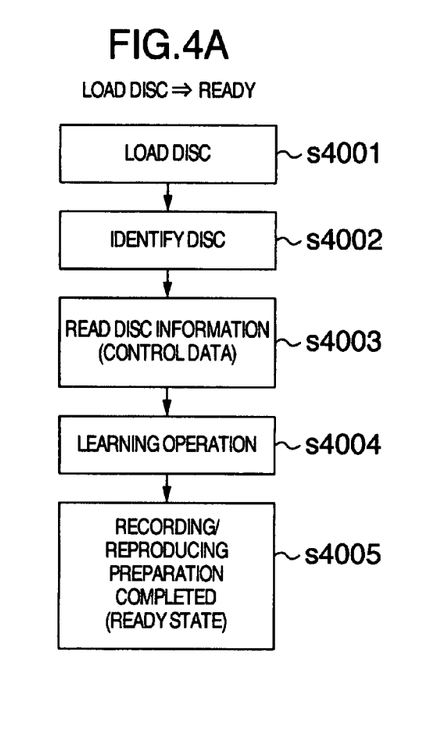
FIGS. 4A to 4C schematically represent operational flows for the optical-information recording/reproducing apparatus as examples respectively.
Figure 4B:
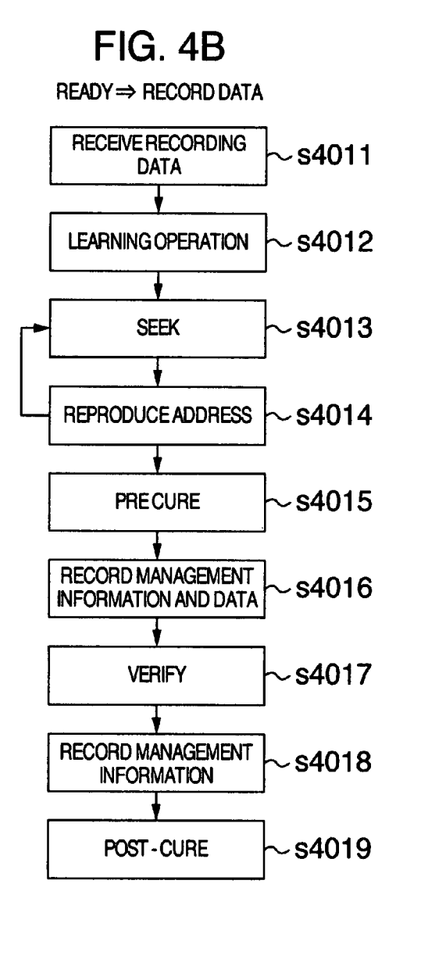
Figure 4C:
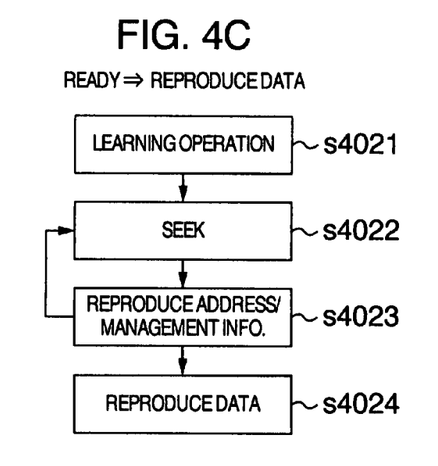

FIGS. 4A, 4B and 4C represent a flow of recording and reproducing operation in the embodiment of the optical-information recording/reproducing apparatus 10. Explanation will be made as to the flow of recording/reproducing operation, in particular, by holography.

FIG. 4A represents an operational flow after the optical-information recording media 1 is loaded into the optical-information recording/reproducing apparatus 10 until preparation of the recording or reproducing operation is completed, FIG. 4B represents an operational flow after the preparation completion state until information is recorded in the optical-information recording media 1, and FIG. 4C represents an operational flow after the preparation completion state until the information recorded in the optical-information recording media 1 is reproduced.

In FIG. 4A, a media is loaded in a step s4001, the optical-information recording/reproducing apparatus 10 identifies the type of the loaded media in a step 4002, for example, for digital information to be recorded therein or reproduced therefrom by holography.

When the optical-information recording/reproducing apparatus 10 determines as a result of the disc identification that the optical-information recording media is of the type for digital information to be recorded or reproduced by holography, the optical-information recording/reproducing apparatus 10 reads out control data provided in the optical-information recording media 1 in a step s4003 and acquires, for example, information about the optical-information recording media 1 and information about various types set conditions in the record or reproduction mode from the read-out data.

The optical-information recording/reproducing apparatus, after reading out the control data, performs various sorts of adjusting operations and learning operation relating to the pickup 11 according to the control data in a step s4004. Thereafter, the optical-information recording/reproducing apparatus 10 completes the preparation of recording or reproducing operation in a step s4005.

In the operational flow after the preparation completion state until the information recording, as indicated by a step s4011 in FIG. 4B, the optical-information recording/reproducing apparatus first receives data to be recorded. The optical-information recording/reproducing apparatus 10 then sends information corresponding to data received in a step s4012 to the spatial light modulator provided in the pickup 11.

Thereafter, the optical-information recording/reproducing apparatus 10 previously perform various sorts of learning operations as occasion demands so as to record a high quality of information in the optical-information recording media 1 in the step s4012. After this, the optical-information recording/reproducing apparatus 10 locates the positions of the pickup 11 and the disc-cure optical unit 13 at predetermined positions in the optical-information recording media 1 while repeating the seek operation of a step s4013 and the address reproduction of a step s4014.

The optical-information recording/reproducing apparatus 10 then pre-cure a predetermined region with use of an optical beam emitted from the disc-cure optical unit 13 in a step s4015, and records the data with use of reference light and signal light emitted from the pickup 11 in a step s4016. The optical-information recording/reproducing apparatus 10 also can record pieces of information different depending on the incident angle of the reference light while changing the angle of the reference light. The incident angle of the reference light when management information is recorded will be explained later. In this connection, "multiplexed recording" to be used hereinafter means to record different pieces of information by changing only the incident angle of the reference light without changing the position of the pickup 11. In this specification, a region having information multiplexed at a position of the single pickup 11 is defined as a unit region. In this specification, a region having information recordable with one reference light angle in one unit region is also defined as unit information.

Figure 5:
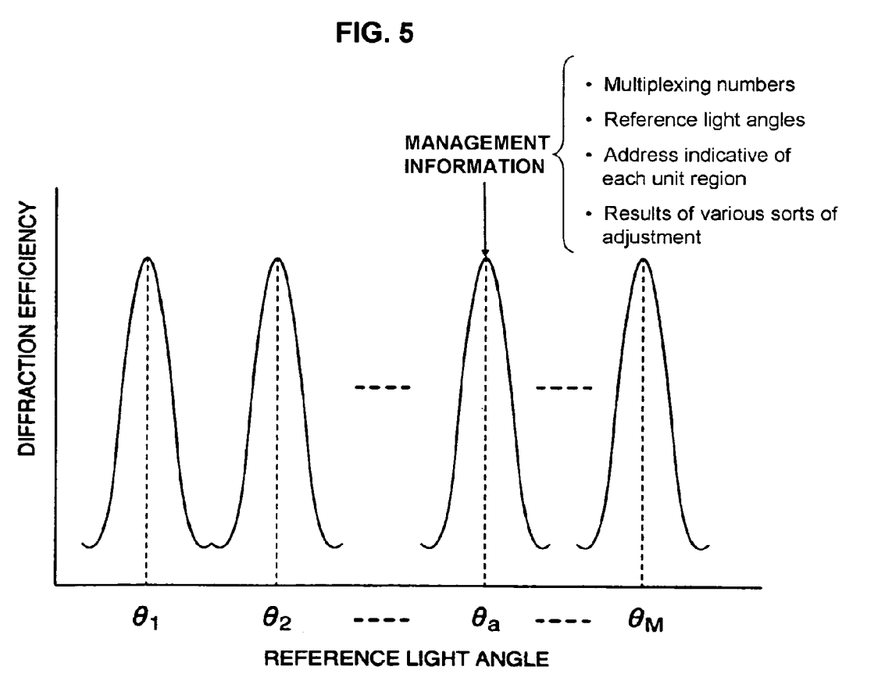
FIG. 5 schematically represents a graph of a relationship between a reference light angle at which reference light is irradiated onto an optical-information recording media and a diffraction efficiency.

By referring to FIG. 5, explanation will now be made as to the relationship between diffraction efficiency and the exposure angle of reference light to the optical-information recording media 1 having information multiplexed and recorded therein.

In the optical-information recording media based on holography, information is recorded in the form of an interference pattern. Thus, when the exposure angle of the reference light is changed to an angle at which an efficient diffraction can be obtained, corresponding unit information can be read out.

When the optical-information recording media 1 has a plurality of unit regions and has a multiplexing number M ($M \geq 2$) for all the unit regions, the optical-information recording/reproducing apparatus 10 records management information for a unit region being recorded as the unit information of the predetermined angle ($\theta a$ in FIG. 5 as an example) of the reference light when information is multiplexed and recorded. The word "management information" as used herein refers to, for example, metadata for user data recorded in each unit region, metadata for already-recorded data, or information for management of user data, etc. recorded in each unit region. More specific examples of the management information will be as follows. That is, the management information includes, for example, multiplexing numbers for information recorded in the unit region, reference light angles for reading out the information multiplexed and recorded in the unit region, and results of various sorts of adjustments. The management information may also include, for example, an address indicative of each unit region.

Figure 6A:
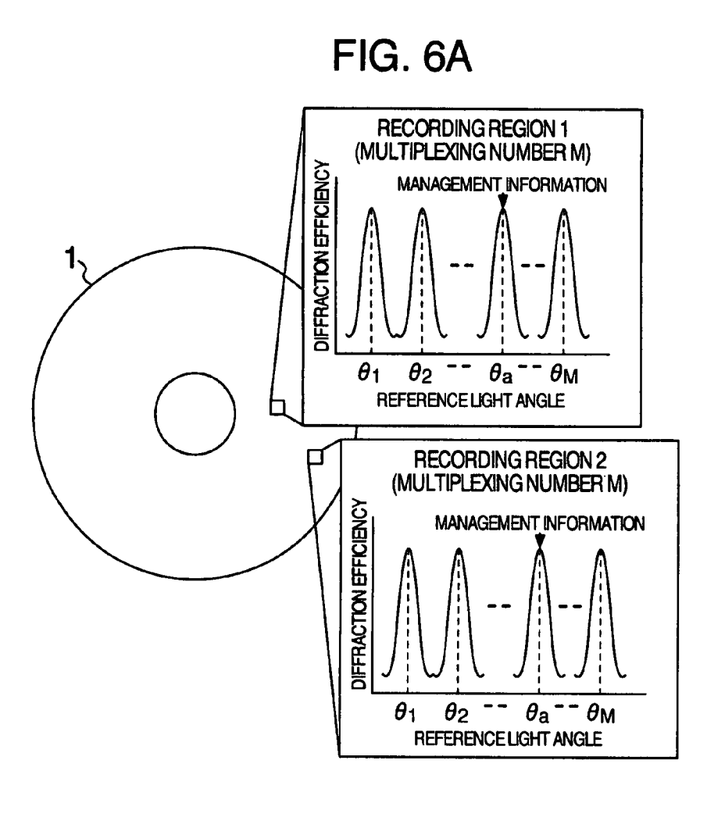
FIGS. 6A and 6B schematically represent examples of the optical-information recording media respectively.

Next, FIG. 6A represents a schematic arrangement of the optical-information recording media 1 recorded in the aforementioned manner. In FIG. 6A, the optical-information recording media 1 is divided into N ($N \geq 2$) unit regions, and has a recording region 1 and a recording region 2 as parts of the divided unit regions. For all the recording regions including the recording regions 1 and 2, the multiplexing number is M ($M \geq 2$). The management information is recorded in all the recording regions of the optical-information recording media 1 at the exposure light angle $\theta a$ by the optical-information recording/reproducing apparatus. In other words, the management information is recorded with the identical reference light angle $\theta a$ for the different unit regions.

In the present embodiment, the word "identical reference-light angle $\theta a$" also includes angles within substantially the same range. The range of the identical reference-light angle $\theta a$ includes $\theta a$ and a range where quality of recording or reproducing information can be secured. For example, an angle in a range where information recorded as a reference-light angle $\theta a$ can be reproduced with an error rate not larger than a predetermined value may be regarded to be approximately the same as the reference light angle $\theta a$. Also, for a region where information is recorded as, for example, a reference light angle $\theta a$, a reference light angle in a range where a diffraction efficiency not smaller than a predetermined value can be obtained may be regarded as approximately the same as the reference light angle $\theta a$.

The range of the same reference light angle may include angles larger or smaller by several degrees than $\theta a$. The word "several degrees" may be 0.05 degrees or other degrees. The range of the angles larger or smaller by several degrees is desirably sufficiently larger than the range of an angle control accuracy of an optical component such as a mirror for controlling the angle of the reference light.

Figure 6B:
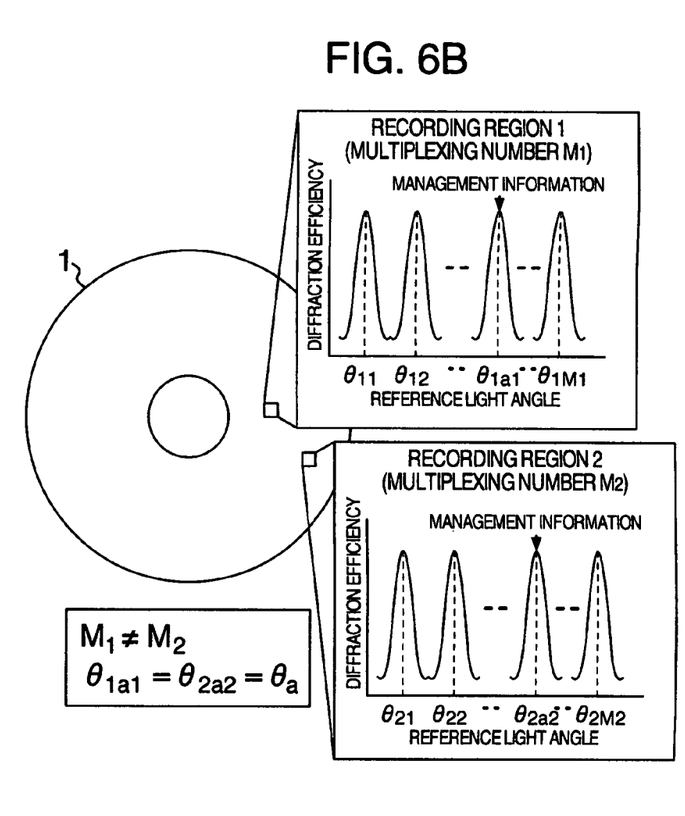

The symbol (=) in FIGS. 6A and 6B is assumed to have a similar meaning to the above.

When the reference light angle is changed for the purpose of reducing the influences by a change in the angle of the optical-information recording media 1 caused, e.g., by a tilt or warpage of the media, a correction component therefor is included in the angle of an optical component such as a mirror for changing the reference light angle or in the absolute angle of the reference light. In this case, it is only required that a relative angle of the reference light to the optical-information recording media 1 at the focal point of the reference light irradiated onto the optical-information recording media 1 be approximately the same as $\theta a$.

The aforementioned arrangement will be explained in another way as follows. Information of the first to M-th pieces can be multiplexed and recorded in an increasing order of the reference light angle in the respective regions of the optical-information recording media 1. The optical-information recording/reproducing apparatus 10 also set the incident angle of the reference light so as to record the management information in the region of a-th ($123 \ a \leq M$) from the smallest incident angle of the reference light.

In the optical-information recording/reproducing apparatus 10, when access is continuously made to the management information recorded in the plurality of unit regions, there can be provided such an optical-information recording media 1 that can reduce a frequency of changing the incident angle of the reference light.

In the above example, explanation has been made as to the example where the management information is recorded in all the N unit regions at the common reference light angle θa. The optical-information recording media 1, however, may be arranged to record the management information in only a part of the full N unit regions at the common reference-light angle θa. In this case, the partial unit region refers to, for example, a region having user data or program data recorded therein. In addition to the N unit regions, a special region may also be provided on the optical-information recording media 1 for recording information about a disc manufacturer, a recommended laser power for signal light or reference light, a distribution of defective regions, etc. and also information about the overall properties of the optical-information recording media 1. The word "recommended laser power" means, for example, an initial value of the laser power before adjusted for trial writing.

Furthermore, unit information for recording the management region is not limited to one piece of the unit information for each unit region. For example, the address information and the multiplexing number may be recorded as different pieces of unit information within the same unit region.

There also may be employed such an arrangement that the exposure angle of the reference light when the management information is recorded is set at an angle larger or smaller than the other reference-light exposure angles of the same region. In other words, the exposure angle when the management information is recorded may be set at either one of a maximum angle or a minimum angle in one unit region. As a result, when it is desired to continuously record or reproduce the full information in the unit regions, the optical-information recording/reproducing apparatus can set the reference angle of the management information at its maximum or minimum value at the beginning of recording or reproducing operation, access the unit regions, and subsequently record or reproduce the other unit information while changing the reference light angle sequentially in a decreasing or increasing order of the reference light angle without varying the angle change direction. In this connection, the word "special region" refers to, for example, a region having information not recorded at the common reference light angle θa. The "special region" may include a region having information recorded based on a physical principle different from holography such as a region where a bar code is marked on the surface of the optical-information recording media 1.

It is also assumed that the number of pieces of unit information to be multiplexed is different for different unit regions. Even in this case, the optical-information recording/reproducing apparatus 10 sets a common reference light angle for the unit regions having different multiplexing numbers and records the management information in the unit region at the reference light angle. A different reference light angle may be employed for recording unit information other than the management information.

FIG. 6B schematically represents an optical-information recording media having information recorded in such a manner as mentioned above. Even in FIG. 6B, the optical-information recording media 1 is divided into N unit regions. The N storage regions have not the common multiplexing number but different multiplexing numbers. A k-th ($1 \leq k \leq N$) region of the N unit regions has a multiplexing number M(k) (M(k)$\geq$2). The optical-information recording media 1 also has a recording region 1 and a recording region 2 as parts of the unit regions. In this case, for example, the recording region 1 has a multiplexing number M1 and the recording region 2 has a multiplexing number M2 different from M1. Management information is recorded by the optical-information recording/reproducing apparatus 10 in all the recording regions of the optical-information recording media 1 at the reference light angle θa.

The above arrangement may also be explained in another way as follows. Information in the first piece to the piece of M(k)-th from the smallest reference-light angle can be multiplexed and recorded in the respective regions of the optical-information recording media 1. The a1-th ($1 \leq a1 \leq M(k)$) information can be recorded in the first region, and the a2-th ($1 \leq a2 \leq M(k)$) information can be recorded in the second other region. In this case, the optical-information recording/reproducing apparatus 10 sets the incident angle of the reference light for the respective regions so as to be able to record the management information in the region of a1-th or a2-th from the smallest incident angle of the reference light.

The optical-information recording media 1 represented in FIG. 6B will be explained in more detail in connection with a specific example.

When a radius position of a unit region is not larger than the half of the disc radius, for example, the number of available reference light angles is 10, and when the radius position of another region is larger than the half of the disc radius, the number of takable reference light angles is 15. Even when the unit regions have different multiplexing numbers, the respective unit regions can be recorded or reproduced at the same reference light angle. And when the optical-information recording/reproducing apparatus 10 of the present embodiment records the management information, its recording is carried out at the incident angle of the reference light common to the regions.

In the optical-information recording/reproducing apparatus 10, in this way, even when recording is carried out for an optical disc having different multiplexing numbers at different positions, there is provided such an optical-information recording media 1 in which access can be made to each unit region with the common reference light angle being kept.

As in the case of FIG. 6A, the optical-information recording/reproducing apparatus 10 may be arranged so that the management information is recorded not in all the N unit regions but also in part of the N unit regions at the common reference light angle θa. Further, the optical-information recording media 1 may is provided with a special region in addition to the N unit regions.

Explanation will be made next as to order of recording the management information when the optical-information recording/reproducing apparatus 10 of the present embodiment records information in a unit region.

For example, the optical-information recording/reproducing apparatus 10 is arranged, when recording information in a unit region, to record the management information lastly of the information recording operation of the unit region. When such an arrangement is employed, information relating to the recorded state of the other unit information already recorded including the multiplexing number, success or fail of recording, or specification of exchange regions when a defect is found in the unit region or in part thereof can be recorded as the management information.

The optical-information recording/reproducing apparatus 10 is also arranged, when recording a unit region, to record the management information firstly of the information recording operation of the unit region. With such an arrangement as mentioned above, even when a problem with recording of the unit information other than the management information occurs later, minimal information such as address information can be remained.

Alternatively, two regions for recording the management information may be provided for one unit region to record the management information in the two regions. Furthermore, it is also possible to make the recording order to record the respective management information at the first and last of a single unit region. In this case, the management information can be efficiently recorded by recording address information or the like in the first management information recording operation and by recording the record state of the unit region or the like in the last management information recording operation.

After the data is recorded, the data is verified as necessary as represented by a step s4017 in FIG. 4B. At this point, information about successful or unsuccessful recording in association with the verified result may be recorded as the management information as represented by a step s4018 in FIG. 4B. Thereafter, a post-cure is carried out using an optical beam emitted from the disc-cure optical unit 13 as represented by a step s4019 in FIG. 4B.

Embodiment 2

Explanation will be made as to an embodiment of the optical-information reproducing apparatus.

Embodiment 2 has such an arrangement as represented in FIG. 1 in which information can be reproduced from the recording media based on the aforementioned hologram principle. The operation of the embodiment 2 is basically the same as the operation of the embodiment 1. However, it is required for the apparatus of the present embodiment only to reproduce information from the optical-information recording media, and elements used only for recording information are not required.

In an operational flow from the preparation completion state until information is reproduced, as represented in FIG. 4C, various sorts of learning operations are previously carried out as occasion demands so as to be able to reproduce a high quality of information from the optical-information recording media (s4021). Thereafter, the pickup 11 and the phase-conjugate optical unit 12 are located at predetermined positions of the optical-information recording media through repetitive seek operation (s4022) and the repetitive reproduction of the address and management information (s4023).

Thereafter, data information other than the management information recorded in the optical-information recording media 1 is read out (s4024).

When it is desired to reproduce information recorded in the optical-information recording media having the management information explained in the embodiment 1 recorded with a predetermined reference light angle as reproducible information, the seek operation can be carried out keeping the angle for the management fixed during it so that it can be able to be reproduced; whereas, the management information can be reproduced without changing the angle immediately after the seek operation.

More specifically, the optical-information reproducing apparatus adjusts the angle of the reference light in such a manner that the management information can be reproduced from the region of a-th ($1 \leq a \leq M$) from the smallest angle of the optical-information recording media 1 of FIG. 6A. At this time, the angle of the reference light is approximately the same as θa.

Also, the optical-information reproducing apparatus adjusts the angle of the reference light in such a manner that the management information can be reproduced from the optical-information recording media 1 of FIG. 6B for the region of a1-th ($1 \leq a1 \leq M(k)$) or a2-th ($1 \leq a2 \leq M(k)$) from the smallest angle. At this time, the angle of the reference light is approximately the same as θa.

Since the management information includes address information on the unit regions, information multiplexing number, successful or unsuccessful recording and exchange information as mentioned above, it can be confirmed whether or not a desired information is recorded in the unit region being reproduced by reproducing the management information prior to data reproduction.

When a unit region having the desired information recorded therein is found, the optical-information reproducing apparatus reproduces data other than the management information by changing the reference light angle.

In order to reproduce the multiplexed information, it is required to change the exposure angle of the reference light to the optical information media. The change of the exposure angle of the reference light can be carried out, for example, by changing the angle of the mirror provided in the pickup 11 as mentioned above, which involves mechanical driving of the optical element. When the reference light in the seek operation is fixed at an angle for the management information to be able to be reproduced, the management information of the unit region can be reproduced immediately after the seek operation thereby enabling confirmation whether desired information is recorded or not without changing the reference light angle, thus enabling a reduction in access time.

Embodiment 3

Explanation will be made next as to another embodiment of the optical-information recording media 1 used in the above embodiments with reference to FIGS. 7A and 7B.

In the embodiments 1 and 2, the optical-information recording media 1 has the unit regions and the angles of the reference light for the management information to be recorded are approximately the same for all the unit regions. In the optical-information recording media 1 of the present embodiment, on the other hand, the angles of the reference light for the management information to be recorded are approximately the same not for all the unit regions but for continuous partial ones of the unit regions. The word "continuous partial unit regions" can refer to, for example, a plurality of unit regions which the optical-information reproducing apparatus can continuously access. This will be explained in detail by referring to drawings.

Figure 7A:
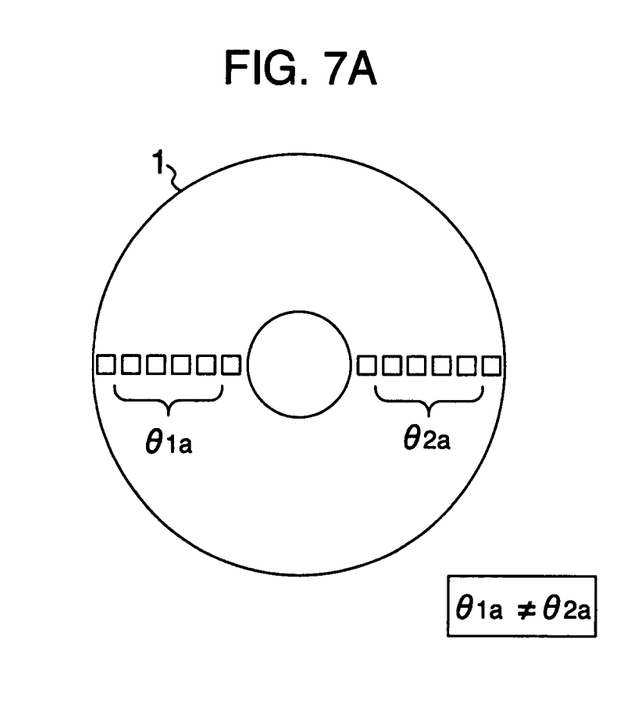
FIGS. 7A and 7B schematically represent other examples of the optical-information recording media respectively.

FIG. 7A represents an optical-information recording media 1 having a reference light angle commonly used for unit regions continuous in the radius direction of the media. In this case, the optical-information recording/reproducing apparatus 10 can continuously access the unit regions by moving the pickup 11 in the radius direction with the fixed angle of the rotating motor 50. In the same drawing, unit regions continuous in the circumferential direction of the media are illustrated to have different angles of reference light for management information to be recorded as an example, but it is not always required for the continuous unit regions to have different reference light angles. Providing with such an arrangement, for example, when access is continuously made to the management information recorded in the unit regions arranged in the radius direction, a time required for accessing operation can be suppressed.

Figure 7B:
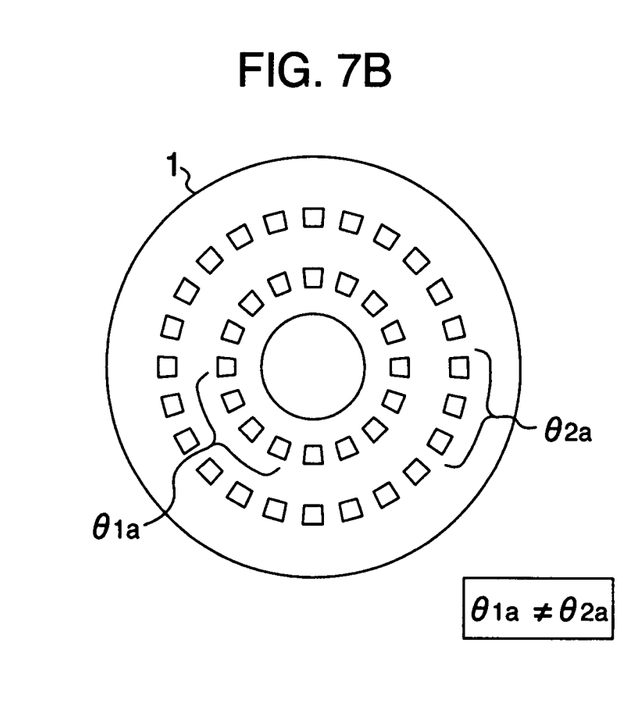

FIG. 7B represents an optical-information recording media 1 having a reference light angle commonly used for unit regions continuous in the circumferential direction of the media. In this case, the optical-information recording/reproducing apparatus 10 continuously access the unit regions of the media along the circumferential direction with the fixed radius position of the pickup 11. In the same drawing, unit regions continuous in the radius direction are illustrated to have different reference light angles for management information to be recorded as an example, but it is not always required for the reference light to have different angles. Provided with such an arrangement, for example, when the apparatus continuously accesses management information recorded in the unit regions arranged in the circumferential direction, a time required for access operation can be suppressed.

The present invention is not limited to the aforementioned embodiments, but can be modified in various ways. For example, the above embodiments have been explained in detail for easy understanding of the present invention. Thus the present invention is not restricted to not having always all the arrangements already explained. Part of one of the arrangements of the embodiments may be replaced by the arrangement of the other embodiment, and the arrangement of the other embodiment may be added to the arrangement of one embodiment. Part or parts of the arrangements of the embodiments may be added to the other arrangement, be deleted or replaced.

Part or all of the aforementioned arrangements may be provided in the form of hardware or may be implemented in the form of program to be executed by a processor. Only control and information lines considered to be necessary for explanation are illustrated but not all of the control and information lines required as a product are illustrated. In practice, substantially all arrangements can be considered to be mutually interconnected.

The invention claimed is:

1. An information recording apparatus for recording information multiplexed in each reference light angle into a recording media by holography, comprising:
   a signal-light irradiation unit for irradiating signal light onto the recording media;
   a reference-light irradiation unit for irradiating reference light onto the recording media; and
   an angle adjustment unit for adjusting an angle for the reference light to be irradiated onto the recording media,
   wherein the angle adjustment unit adjusts an angle of the reference light at M angles in N (N≧2) recording regions which are divisions of the recording media, thereby M information multiplexed by the multiplexing number M can be recorded in the recording media, and management information for management of the M multiplexed information in the respective recording region is recorded at a reference light angle which is common to the N recording regions by the angle adjustment unit adjusting an angle of the reference light at the reference light angle which is common to the N recording regions.

2. An information recording apparatus according to claim 1, wherein
   the recording media has a disc shape,
   the apparatus also comprises a positioning unit for positioning exposure positions of the signal light and the reference light on the recording media,
   the positioning unit includes a rotating section for rotating the recording media and an optical-pickup moving section for moving an optical pickup having the signal-light irradiation unit and the reference light irradiation unit in a radius direction of the recording media.

3. An information recording apparatus according to claim 1, wherein the reference light angle for recording the management information is a maximum or minimum angle among the M reference light angles.

4. An information recording apparatus for recording information multiplexed in each reference light angle into a recording media by holography, comprising:
   a signal-light irradiation unit for irradiating the recording media with signal light;
   a reference-light irradiation unit for irradiating the recording media with reference light; and
   an angle adjustment unit for adjusting an angle for the reference light to be irradiated to the recording media,
   wherein the angle adjustment unit adjusts an angle of the reference light at M(k) angles, M(k) corresponding to a multiplexing number M(k)(M(k)≧2, 1≦k≦N) in N (N≧2) recording regions which are divisions of the recording media and M(k) not being common to all the recording regions, thereby M(k) multiplexed information can be recorded in the respective recording region, and management information for managing M(k) information multiplexed in the respective recording region is recorded at a reference light angle which is common to the N recording regions by the angle adjustment unit adjusting an angle of the reference light at the reference light angle which is common to the N recording regions.

5. An information recording apparatus according to claim 1, wherein the management information includes at least one of address information for the recording regions, the information multiplexing number, and optimum reference-light-angle information for reading out the multiplexed information.

6. An information recording apparatus according to claim 2, wherein the management information includes at least one of address information for the recording regions, the information multiplexing number, and optimum reference-light-angle information for reading out the multiplexed information.

7. An information recording apparatus according to claim 3, wherein the management information includes at least one of address information for the recording regions, the information multiplexing number, and optimum reference-light-angle information for reading out the multiplexed information.

8. An information recording apparatus according to claim 4, wherein the management information includes at least one of address information for the recording regions, the information multiplexing number, and optimum reference-light-angle information for reading out the multiplexed information.

9. A recording media capable of reading out information multiplexed in each reference light angle therefrom by holography,
   wherein the recording media is divided into N (N≧2) recording regions,
   M information multiplexed by a multiplexing number M (M≧2) is recorded in the respective recording region,
   the multiplexed information can be selectively reproduced by setting an irradiation angle of an information reading laser at M angles corresponding to the multiplexing number M, and
   the management information associated with the M pieces of information of the recording region is recorded as a-th (1≦a≦M) information of the M pieces of information of the respective recording region, reproducible by irradiating reference light at an angle which is common to the N recording regions.

10. A recording media according to claim 9, wherein the management information recorded as the a-th information includes at least one of address information on the recording region, the information multiplexing number, optimum reference light angle information for reading out the multiplexed information.

11. A recording media capable of reading out information multiplexed in each reference light angle therefrom by holography,
wherein the recording media is divided into N (N≧2) recording regions,
information multiplexed by a multiplexing number M(k) (M(k)>2, 1≦k≦N) which is not common to all the regions is recorded in the respective recording regions, the multiplexed information can be selectively reproduced by setting an irradiation angle of an information reading laser at M(k) angles corresponding to the multiplexing number M(k), and
management information associated with the M(k) information of the regions is recorded in all the recording regions as information of the M(k) information reproducible by irradiating reference light to the regions at an angle which is common to the N recording regions.

12. An information reproducing apparatus for reproducing information multiplexed in each reference light angle from a recording media, wherein the recording media is divided into N (N≧2) recording regions, M information multiplexed by a multiplexing number M (M≧2) is recorded in the respective recording region, the multiplexed information can be selectively reproduced by setting an irradiation angle of an information reading laser at M angles corresponding to the multiplexing number M, and the management information associated with the M pieces of information of the recording region is recorded as a-th (1≦a≦M) information of the M pieces of information of the respective recording region, reproducible by irradiating reference light at an angle which is common to the N recording regions;
the information reproducing apparatus comprising;
a reference light irradiation unit for irradiating reference light onto the recording media;
an angle adjustment unit for adjusting an angle for the reference light to be irradiated onto the recording media; and
a positioning unit for positioning an irradiation position of the reference light on the recording media,
wherein when the positioning unit searches for an arbitrary region, positioning is executed in such a manner that the angle adjustment unit sets the irradiation angle of the reference light to the recording media at the angle which is common to the N recording regions and at which the a-th information in the M multiplexed information can be reproduced.

13. An information reproducing apparatus for reproducing information multiplexed in each reference light angle from a recording media, wherein the recording media is divided into N (N≧2) recording regions, M information multiplexed by a multiplexing number M (M≧2) is recorded in the respective recording region, the multiplexed information can be selectively reproduced by setting an irradiation angle of an information reading laser at M angles corresponding to the multiplexing number M, the management information associated with the M pieces of information of the recording region is recorded as a-th (1≦a≦M) information of the M pieces of information of the respective recording region, reproducible by irradiating reference light at an angle which is common to the N recording regions, and the management information recorded as the a-th information includes at least one of address information on the recording region, the information multiplexing number, optimum reference light angle information for reading out the multiplexed information;
the information reproducing apparatus comprising:
a reference light irradiation unit for irradiating reference light onto the recording media; an angle adjustment unit for adjusting an angle for the reference light to be irradiated onto the recording media; and
a positioning unit for positioning an irradiation position of the reference light on the recording media,
wherein when the positioning unit searches for an arbitrary region, positioning is executed in such a manner that the angle adjustment unit sets the irradiation angle of the reference light to the recording media at the angle which is common to the N recording regions and at which the a-th information in the M multiplexed information can be reproduced.

14. An apparatus for recording information multiplexed in each reference light angle by holography in a recording media divided into a plurality of recording regions in which multiplexed information can be recorded by adjusting an angle of reference light, the apparatus comprising:
a signal-light irradiation unit for irradiating signal light onto the recording media;
a reference-light irradiation unit for irradiating reference light onto the recording media; and
an angle adjustment unit for adjusting an angle for the reference light to be irradiated to the recording media,
wherein when it is desired to record management information in continuous recording regions, the angle adjustment unit is adjusted to record the information with a common reference light angle.

15. An information recording apparatus according to claim 14, wherein the recording media has a disc shape, and when it is desired to record management information in recording regions continuous in a circumferential direction on the recording media, the angle adjustment unit is adjusted to record the information with a common reference light angle.

16. An information recording apparatus according to claim 14, wherein the recording media has a disc shape, and when it is desired to record management information in recording regions continuous in a radius direction on the recording media, the angle adjustment unit is adjusted to record the information with a common reference light angle.

17. An information recording apparatus for recording information multiplexed in each reference light angle in a recording media by holography, comprising:
a signal-light irradiation unit for irradiating signal light onto the recording media;
a reference-light irradiation unit for irradiating reference light onto the recording media; and
an angle adjustment unit for adjusting an angle for the reference light to be irradiated to the recording media,
wherein the angle adjustment unit adjust the angle of the reference light at M angles in N (N≧2) recording regions which are divisions of the recording media, thereby M multiplexed information can be recorded media, and when it is desired to record management information for management of M multiplexed information to be multiplexed in the respective recording regions, the management information is recorded in a region of a-th (1≦a≦M) from the smallest reference light angle of the N recording regions by the angle adjustment unit adjusting an angle of the reference light at the reference light angle which is common to the N recording regions.

* * * * *